US010243942B2

(12) United States Patent
Mochizuki et al.

(10) Patent No.: US 10,243,942 B2
(45) **Date of Patent: *Mar. 26, 2019**

(54) DISPLAYING THE ACCESSIBILITY OF HYPERLINKED FILES

(71) Applicant: International Business Machines Corporation, Armonk, NY (US)

(72) Inventors: Tomoka Mochizuki, Tokyo (JP); Tomonori Sugiura, Yokohama (JP); Lianzi Wen, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,527

(22) Filed: Sep. 20, 2017

(65) Prior Publication Data

US 2018/0007028 A1 Jan. 4, 2018

Related U.S. Application Data

(63) Continuation of application No. 14/739,117, filed on Jun. 15, 2015, now Pat. No. 9,887,977.

(30) Foreign Application Priority Data

Jul. 25, 2014 (JP) ................................ 2014-152366

(51) Int. Cl.

*H04L 29/06* (2006.01)
*G06F 17/30* (2006.01)
*G06F 21/62* (2013.01)

(52) U.S. Cl.

CPC ........ *H04L 63/08* (2013.01); *G06F 17/30882* (2013.01); *G06F 21/6218* (2013.01); *H04L 63/10* (2013.01)

(58) Field of Classification Search

None

See application file for complete search history.

(56) References Cited

U.S. PATENT DOCUMENTS 6,408,296 B1 6/2002 Acharya et al.
7,461,257 B2 12/2008 Olkin et al.

(Continued)

FOREIGN PATENT DOCUMENTS

JP 11039341 A 2/1999
JP 11085801 A 3/1999

(Continued)

OTHER PUBLICATIONS

"Welcome to Gmail", printed on Apr. 7, 2015, pp. 1-2, <https://www.gmail.com/intl/en/mail/help/about.html>.

(Continued)

*Primary Examiner* — Trang T Doan

(74) *Attorney, Agent, or Firm* — Daniel Yeates

(57) ABSTRACT

The accessibility of a hyperlinked files is displayed. A hyperlink that references a resource is extracted from a target file. An attempt to acquire the resource is made by performing a first authentication operation. A first object is received in response to performing the authentication operation. A second object is acquired by performing a second authentication operation using pre-determined authentication information. The first object and the second object are compared to determine if the first object is the same as the second object. Information indicating the accessibility of the resource is presented via a display apparatus.

18 Claims, 11 Drawing Sheets

(56) References Cited

U.S. PATENT DOCUMENTS 8,127,219 B1 2/2012 Gupta
8,209,541 B2 6/2012 Deutschmann et al.
9,887,977 B2 2/2018 Mochizuki
2004/0083294 A1 4/2004 Lewis
2005/0165789 A1* 7/2005 Minton ............ G06F 17/30896
2006/0271789 A1* 11/2006 Satomura ............... G06F 21/41 713/183
2008/0212846 A1* 9/2008 Yamamoto ......... G06K 9/00087 382/115
2008/0216163 A1* 9/2008 Pratte .................... G06F 21/316 726/7
2008/0256459 A1* 10/2008 Sekiya .................... G06F 21/32 715/741
2009/0031033 A1* 1/2009 Deng .................... H04L 63/126 709/229
2010/0082674 A1* 4/2010 Yiu ....................... G06F 17/273 707/780
2010/0287231 A1 11/2010 Hughes, Jr. et al.
2011/0023112 A1* 1/2011 Murai ..................... G06F 21/36 726/17
2011/0179466 A1* 7/2011 Hamada ............ H04N 1/00464 726/3
2011/0251895 A1 10/2011 Bladel
2012/0311669 A1* 12/2012 Akase ................... H04L 63/083 726/3
2013/0091585 A1* 4/2013 Dumais ................. H04L 63/126 726/27
2013/0141743 A1* 6/2013 Miyazawa ........... H04N 1/4426 358/1.13
2013/0239192 A1* 9/2013 Linga ...................... G06F 21/44 726/7
2014/0157383 A1* 6/2014 Huang .................. H04L 63/083 726/7
2015/0033029 A1* 1/2015 Nakajima ............. H04L 9/3226 713/184
2015/0113478 A1 4/2015 Nakayama et al.
2015/0178490 A1* 6/2015 Tamboly ................. G06F 21/36 726/4
2016/0028706 A1 1/2016 Mochizuki et al.
2016/0103876 A1 4/2016 Bakir
2018/0007029 A1 1/2018 Mochizuki
2018/0063112 A1 3/2018 Mochizuki

FOREIGN PATENT DOCUMENTS

JP 2000172614 A 6/2000
JP 2000267998 A 9/2000
JP 2001014207 A 1/2001
JP 2002259215 A 9/2002
JP 2002342270 A 11/2002
JP 2010033483 A 2/2010
JP 5999664 B2 9/2016

OTHER PUBLICATIONS

"Yahoo Login", printed on Apr. 7, 2015, p. 1, <https://login.yahoo.com/.

List of IBM Patents or Patent Applications Treated as Related, Sep. 18, 2017. 2 pages.

Mochizuki et al., "Displaying the Accessibility of Hyperlinked Files", U.S. Appl. No. 15/709,539, filed Sep. 20, 2017.

Mochizuki et al., "Displaying the Accessibility of Hyperlinked Files", U.S. Appl. No. 15/709,547, filed Sep. 20, 2017.

Decision to Grant a Patent, Patent Application No. 2014-152366. Drafted Jul. 26, 2016, Translated Sep. 6, 2017. 3 pages.

Notification of Reasons for Refusal, Patent Application No. 2014-152366. Drafted Jun. 17, 2016, Translated Sep. 6, 2017. 3 pages.

* cited by examiner

160

| | LINK | ID | PASSWORD | DETERMINATION DATE AND TIME |
|---|---|---|---|---|
| 1 | https://accounts.google.com/ServiceLogin?service=mail&continue=https://mail.google.com/mail/&hl=ja | xxxx@gmail.com | Password | 2013/07/01 17:22:58 |
| 2 | https://login.yahoo.co.jp/config/login | xxxx@yahoo.com | Password | 2013/07/02 10:22:58 |
| ... | ... | ... | ... | |

```
<form id="gaia_loginform" action="https://accounts.xxxxxx.com/ServiceLoginAuth" method="post" novalidate="">
<input type="hidden" value="GRNUtf2heIM" name="GALX"></input>
<input type="hidden" value="https://mail.xxxxxx.com/mail/" name="continue"></input>
<input type="hidden" value="mail" name="service"></input>
<input type="hidden" value="ja" name="hl"></input>
<input id="_utf8" type="hidden" value="☃" name="_utf8"></input>
<input id="bgresponse" type="hidden" value="js_disabled" name="bgresponse"></input>
<input id="pstMsg" type="hidden" value="1" name="pstMsg"></input>
<input id="dnConn" type="hidden" value="" name="dnConn"></input>
<input id="checkConnection" type="hidden" value="tube:192:1" name="checkConnection"></input>
<input id="checkedDomains" type="hidden" value="tube" name="checkedDomains"></input>
<label class="hidden-label" for="Email"></input>
<input id="Email" class="" type="email" spellcheck="false" value="" placeholder=" E-MAIL ADDRESS " name="Email"></input>
<label class="hidden-label" for="Passwd"></input>
<input id="Passwd" class="" type="Password" placeholder=" PASSWORD " name="Passwd"></input>
<input id="signIn" class="rc-button rc-button-submit" type="submit" value=" LOGIN " name="signIn"></input>
<label class="remenber"></input>
      .
      .
      .
```

DISPLAYING THE ACCESSIBILITY OF HYPERLINKED FILES

BACKGROUND OF THE INVENTION

The present disclosure relates to a technique for displaying a hyperlinked file, and, more particularly, to techniques for displaying the accessibility of a link destination of a hyperlink set to a file.

A computer displaying a hyperlinked file, such as an HTML file, can access an object at a link destination of the hyperlink on the basis of network position information such as a uniform resource locator (URL) indicated by the hyperlink. However, in the case where the computer does not have the right of access to the object at the link destination, even if the computer requests to access the object, the computer cannot acquire, open, or play back the object.

SUMMARY

According to one embodiment of the present disclosure, a method for displaying the accessibility of a hyperlinked file is provided. The method includes extracting, by one or more computer processors, a hyperlink from a target file, wherein the hyperlink references a resource; attempting to acquire, by one or more computer processors, the resource by performing a first authentication operation and, in response, receiving a first object; acquiring, by one or more computer processors, a second object by performing a second authentication operation using pre-determined authentication information; comparing, by one or more computer processors, the first object and the second object to determine if the first object is the same as the second object; and presenting, by one or more computer processors, via a display apparatus, information indicating the accessibility of the resource, wherein the information is based, at least in part, on the comparison between the first object and the second object and further based, at least in part, on the target file.

According to another embodiment of the present disclosure, a computer program product for displaying the accessibility of a hyperlinked file is provided. The computer program product comprises a computer readable storage medium and program instructions stored on the computer readable storage medium. The program instructions include program instructions to extract a hyperlink from a target file, wherein the hyperlink references a resource; program instructions to attempt to acquire the resource by performing a first authentication operation and, in response, receive a first object; program instructions to acquire a second object by performing a second authentication operation using pre-determined authentication information; program instructions to compare the first object and the second object to determine if the first object is the same as the second object; and program instructions to present, via a display apparatus, information indicating the accessibility of the resource, wherein the information is based, at least in part, on the comparison between the first object and the second object and further based, at least in part, on the target file.

According to another embodiment of the present disclosure, a computer system for displaying the accessibility of a hyperlinked file is provided. The computer system includes one or more computer processors, one or more computer readable storage media, and program instructions stored on the computer readable storage media for execution by at least one of the one or more processors. The program instructions include program instructions to extract a hyperlink from a target file, wherein the hyperlink references a resource; program instructions to attempt to acquire the resource by performing a first authentication operation and, in response, receive a first object; program instructions to acquire a second object by performing a second authentication operation using pre-determined authentication information; program instructions to compare the first object and the second object to determine if the first object is the same as the second object; and program instructions to present, via a display apparatus, information indicating the accessibility of the resource, wherein the information is based, at least in part, on the comparison between the first object and the second object and further based, at least in part, on the target file.

BRIEF DESCRIPTION OF THE DRAWINGS

FIG. 2 is a diagram illustrating a configuration example of an authentication information database, in accordance with an embodiment of the present disclosure;

FIG. 7 is a diagram illustrating an example of a source code of the object, in accordance with an embodiment of the present disclosure;

DETAILED DESCRIPTION

Various techniques exist to determine whether or not a user has the right of access to an object at a link destination and notify the user of whether or not the access thereto is possible. One example of such a technique is to examine whether or not a page indicated by a link existing on a page actually exists. If the indicated page actually exists, an acquisition request for the page is actually made on the basis of user information prepared in advance, whereby it is determined whether or not the user has the right of access to the page. Then, on the basis of these examination result and determination result, it is determined whether or not the user can refer to the page at the link destination. According to the determination result, a display mode of the link is determined. Another example of a technique is to determine whether or not an object at a link destination falls under a restriction target with reference to access restriction information prepared in advance.

Embodiments of the present disclosure recognize that, in general, it is difficult to determine the response(s) that indicate that a hyperlinked file is accessible by making an access request using information that is prepared in advance and is necessary for the access. For example, in the case where the returned object content changes for each access to the object at the link destination and thus cannot be identified, it is difficult to determine whether the acquired object is a correct response result for the access request or an object that is returned as a result of denied access.

Embodiments of the present disclosure also recognize that, in the case of preparing access restriction information in advance, it is necessary to update the access restriction information in accordance with a change in specifications of the access destination and the like, and hence management is therefore complicated.

Accordingly, embodiments of the present disclosure provide a technique for displaying the accessibility of a link destination of a hyperlink set to a file.

Hereinafter, various embodiments of the present disclosure are described in detail with reference to the attached drawings.

Figure 1:
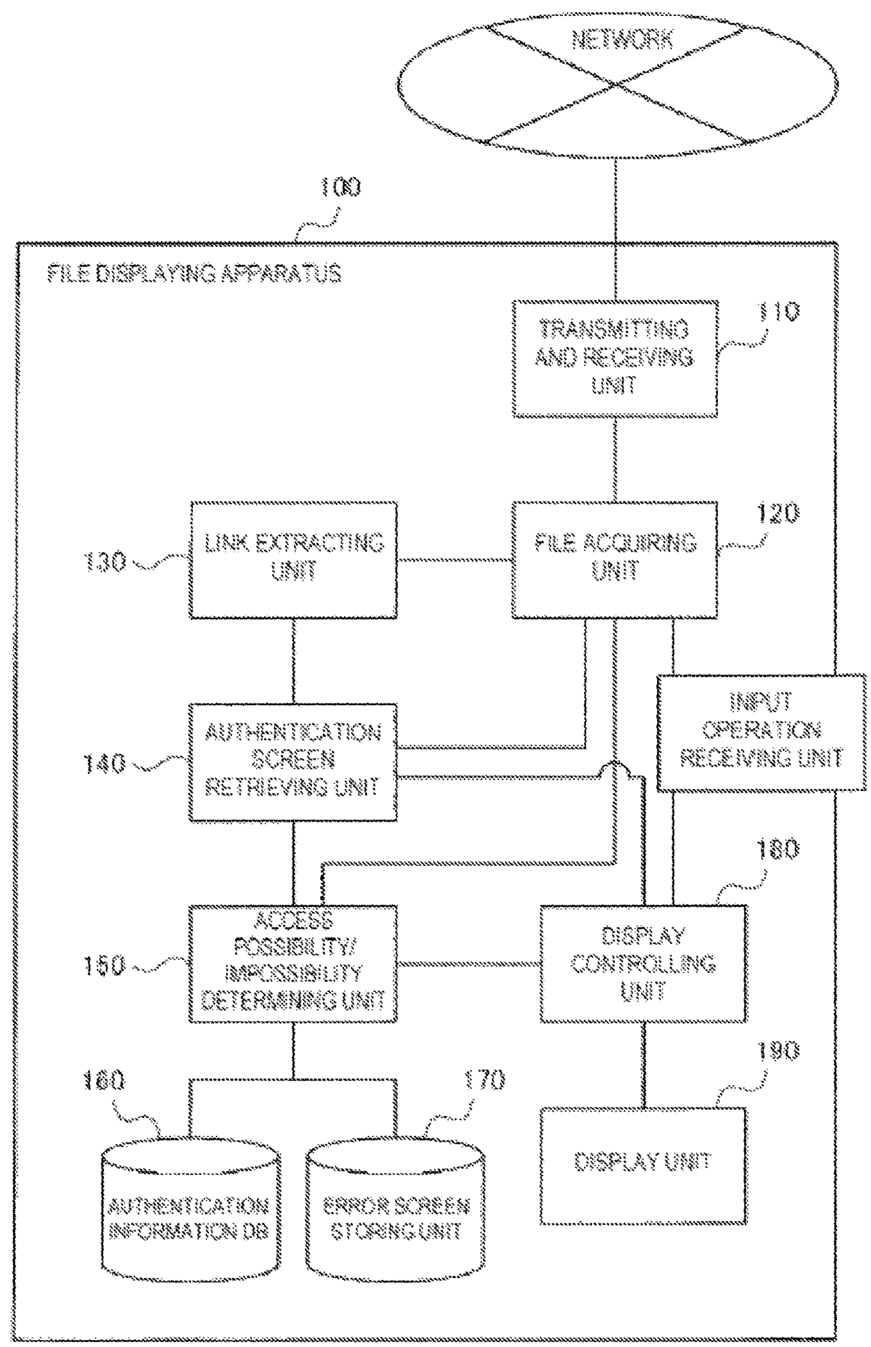
FIG. 1 is a diagram illustrating a configuration example of a file displaying apparatus to which the embodiment of the present disclosure is applied, in accordance with an embodiment of the present disclosure.

System Configuration:

FIG. 1 is a diagram illustrating a configuration example of a file displaying apparatus, in accordance with an embodiment of the present disclosure. A file displaying apparatus 100 illustrated in FIG. 1 includes a transmitting and receiving unit 110 and a file acquiring unit 120 for acquiring a file to be processed. The file displaying apparatus 100 further includes a link extracting unit 130, an authentication screen retrieving unit 140 and an accessibility determining unit 150 for processing a hyperlink included in the acquired file. The file displaying apparatus 100 further includes an authentication information DB 160 and an error screen storing unit 170 for holding information used to process the hyperlink. The file displaying apparatus 100 further includes a display controlling unit 180 and a display unit 190 for displaying the file. As illustrated in FIG. 1, the file displaying apparatus 100 is connected to a network such as the Internet.

The transmitting and receiving unit 110 is a network interface for accessing the network. Acquisition requests for a file to be displayed or display target file and an object at a link destination are transmitted through the transmitting and receiving unit 110, and the file and the object returned as a response to the acquisition requests are received therethrough.

The file acquiring unit 120 generates the acquisition request for the file, and transmits the acquisition request to a site (such as a server on the network) on which the acquisition target file exists, through the transmitting and receiving unit 110. Then, the file acquiring unit 120 receives the file returned as a response to the acquisition request. Such file acquisition is performed by the file acquiring unit 120 in the case where a user of the file displaying apparatus 100 inputs a command for acquiring the file. In this case, the acquired file is transmitted to the display controlling unit 180, and is displayed on the display unit 190 by the display controlling unit 180.

Moreover, in some embodiments, file acquisition is performed by the file acquiring unit 120 also in the case where link information is extracted by the link extracting unit 130 as described later or in the case where authentication information is transmitted from an authentication screen by the accessibility determining unit 150 and where a response screen is acquired. In these cases, the acquired file is not displayed on the display unit 190 but processed in the background.

The link extracting unit 130 determines whether or not a hyperlink is set to the display target file acquired by the file acquiring unit 120. If the hyperlink is set thereto, the link extracting unit 130 extracts link information of the hyperlink. Appropriate techniques can be used to determine whether or not the hyperlink is set thereto and extract the link information. For example, in the case where the display target file is an HTML file, the link extracting unit 130 may detect a portion in which a URL is specified in the href attribute of an a element (anchor element), and may extract the specified URL. As described above, if the link information is extracted by the link extracting unit 130, the file acquiring unit 120 acquires the file of the object at the link destination using the extracted link information.

In some embodiments, examples of the timing at which the link extracting process is performed by the link extracting unit 130 include: when a new screen is displayed on the display unit 190 on the basis of the file acquired by the file acquiring unit 120; and when a mouse pointer is placed (hovered) over the position at which a hyperlink is set on the screen displayed on the display unit 190. Moreover, in the case where the file acquired by the file acquiring unit 120 is an e-mail message, upon reception of the e-mail message, the link extracting unit 130 may extract a hyperlink included in the received message. Moreover, for the same hyperlink, the link extracting unit 130 may extract only the one for which predetermined days and hours or longer have elapsed from the last extraction thereof.

The authentication screen retrieving unit 140 determines whether or not an authentication screen exists in the object at the link destination that is acquired on the basis of the link information extracted by the link extracting unit 130. Specifically, the authentication screen retrieving unit 140 first examines whether or not an input/transmission form exists in the object at the link destination. Then, if the input/transmission form exists, the authentication screen retrieving unit 140 determines whether or not the form is for authentication, on the basis of the contents of inputs requested by the form. The detail of the process performed by the authentication screen retrieving unit 140 is described later.

The accessibility determining unit 150 performs an operation for authentication (i.e., an authentication operation) on an object that is determined by the authentication screen retrieving unit 140 to include the authentication screen, and determines whether or not an object at a link destination from the authentication screen can be accessed. In some embodiments, the accessibility determining unit 150 performs in advance an authentication operation that always denies the access, on the authentication screen, and acquires in advance an object (error screen) that is returned from the site at the link destination in the case where the access is denied (authentication failure). Then, the accessibility determining unit 150 performs a proper authentication operation for accessing the object at the link destination, and compares an object returned from the site at the link destination with the error screen acquired in advance. Then, if the object acquired in the proper authentication operation is the same as the error screen, the accessibility determining unit 150 determines that the access is denied. If the object acquired in the proper authentication operation is different from the error screen, the accessibility determining unit 150 determines that the access is permitted. Here, the object acquired in the proper authentication operation may be compared with the error screen by comparing respective pieces of data of the acquired objects or by comparing an image (such as a screen shot) when the object acquired in the proper authentication operation is displayed on the display unit 190, with an image of the error screen. In the case of comparing the images, for example, respective display images of the objects are generated by the display controlling unit 180, and it can be determined whether or not the generated images are the same as each other, using an existing image analysis technique. The detail of the process performed by the accessibility determining unit 150 is described hereafter.

The authentication information DB 160 is a database (i.e., and authentication information storing unit) for storing information for authentication (i.e., authentication information) on the object at the link destination. Specifically, the authentication information DB 160 stores therein network position information (for example, a URL) on an object on the network and authentication information (for example, an ID and a password) required to access the object in association with each other. The accessibility determining unit 150 performs an authentication operation for the site at the link destination using the authentication information stored in the authentication information DB 160.

FIG. 2 is a diagram illustrating a configuration example of the authentication information DB 160, in accordance with an embodiment of the present disclosure. In the example illustrated in FIG. 2, the URL of a link destination, the ID and the password for authentication, and the date and time (written as "DETERMINATION DATE AND TIME" in FIG. 2) at which the accessibility is last determined using the ID and the password are stored in each record in association with each other.

The error screen storing unit 170 stores therein the error screen acquired by performing, by the accessibility determining unit 150, the authentication operation that denies the access. The accessibility determining unit 150 determines whether or not the access is permitted by comparing the object that is returned from the site at the link destination as a response to the authentication operation performed using the authentication information read out of the authentication information DB 160, with the error screen stored in the error screen storing unit 170.

The display controlling unit 180 displays the object based on the display target file acquired by the file acquiring unit 120, on the display unit 190. Moreover, the display controlling unit 180 displays information indicating whether or not the object at the link destination of the hyperlink set to the file displayed on the display unit 190 can be accessed, in accordance with the determination result given by the accessibility determining unit 150. The display unit 190 may be implemented by a liquid crystal display device or the like.

Figure 3:
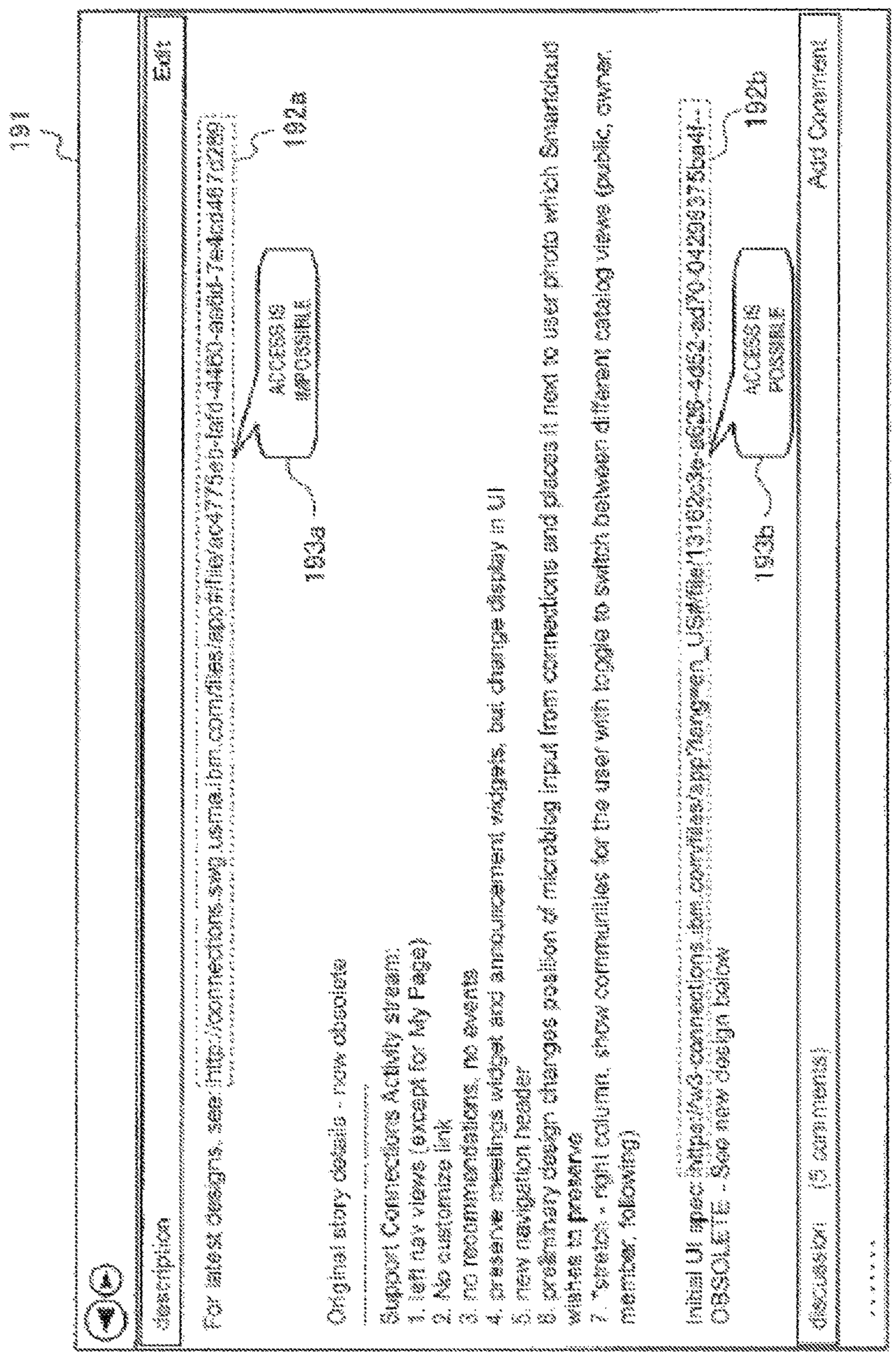
FIG. 3 is a diagram illustrating a display example of a file on which information on the accessibility of an object at a link destination is displayed, in accordance with an embodiment of the present disclosure.
Figure 4:
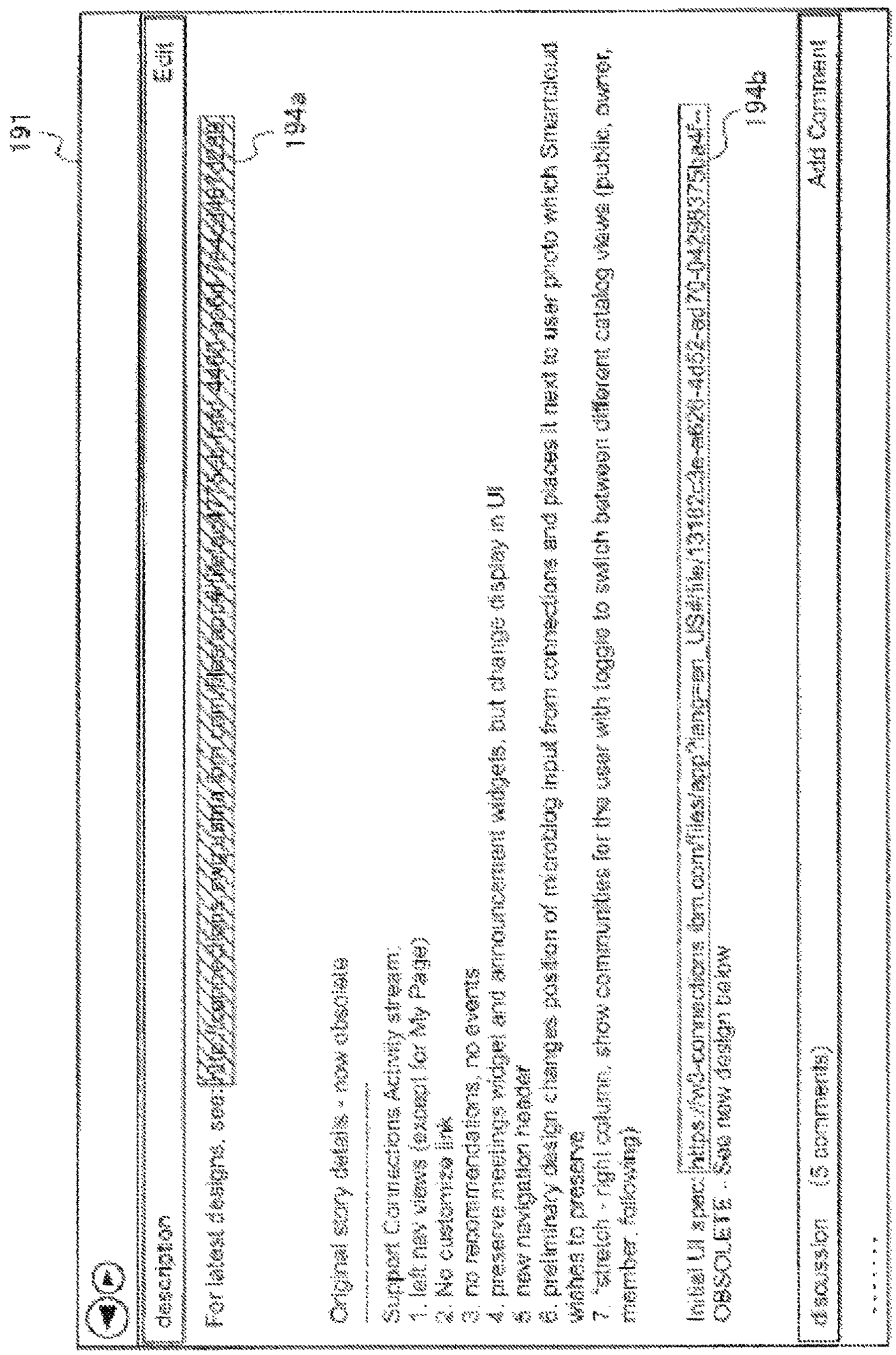
FIG. 4 is a diagram illustrating another display example of the file on which the information on the accessibility of the object at the link destination is displayed, in accordance with an embodiment of the present disclosure.

Example of Display Control based on Determination of Accessibility:

FIG. 3 and FIG. 4 are diagrams each illustrating a display example of a file on which the information on the accessibility of an object at a link destination is displayed, in accordance with embodiments of the present disclosure. Description is given here of an example in which a display image 191 based on a document file is displayed as a display target file. In the example illustrated in FIG. 3, with reference to the display image 191 based on the document file as the display target, two hyperlinks 192*a* and 192*b* (in FIG. 3, URL portions surrounded by broken lines) are set to the document file. The accessibility determining unit 150 determines that access is impossible for the hyperlink 192*a* of the two hyperlinks and that access is possible for the hyperlink 192*b* of the two hyperlinks. Accordingly, in the example illustrated in FIG. 3, a message to the effect that access is impossible (the user does not have the right of access) is displayed for the hyperlink 192*a*, using a balloon object 193*a*. Moreover, a message to the effect that access is possible (the user has the right of access) is displayed for the hyperlink 192*b*, using a balloon object 193*b*.

In the example illustrated in FIG. 4, the determination results of the accessibility are respectively indicated by display modes of the hyperlinks 192*a* and 192*b*, instead of displaying the messages. In the example illustrated in FIG. 4, the URL of the hyperlink 192*a* for which the object at the link destination cannot be accessed (the user does not have the right of access thereto) is covered by a hatched and/or shaded portion 194*a*. On the other hand, the URL of the hyperlink 192*b* for which the object at the link destination can be accessed (the user has the right of access thereto) is surrounded by a frame line 194*b*.

As described above, in some embodiments, the information indicating whether or not the object at the link destination of each hyperlink (in the example illustrated in FIG. 3, the hyperlinks 192*a* and 192*b*) set to the display target object can be accessed is displayed on the display image 191 on the display unit 190. Accordingly, once the display image 191 is displayed (before the user of the file displaying apparatus 100 performs a selection operation for requesting to access the object at the link destination of the hyperlink), the user can recognize whether or not the object at the link destination can be accessed. Note that the display methods concerning the accessibility illustrated in FIG. 3 and FIG. 4 are given as mere examples. According to various embodiments, when an object such as a document including a hyperlink is displayed on the display unit 190, if it is possible to recognize whether or not an object at a link destination of the hyperlink included in the displayed object can be accessed, any display method can be adopted to display the determination result of the accessibility determining unit 150. The technique for displaying the determination result of the accessibility determining unit 150 is not limited to the display methods illustrated in FIG. 3 and FIG. 4.

Accessibility Determining Process:

Next, an accessibility determining process performed by the file displaying apparatus 100 is discussed, in accordance with an embodiment of the present disclosure. In the case where a hyperlink is set to a display target file acquired to be displayed on the display unit 190, the file displaying apparatus 100 performs, in the background, a process of determining whether or not an object at a link destination of the hyperlink can be accessed. Then, as described with reference to FIG. 3 and FIG. 4, the file displaying apparatus 100 displays determination results on the display image of the file displayed on the display unit 190.

Figure 5:
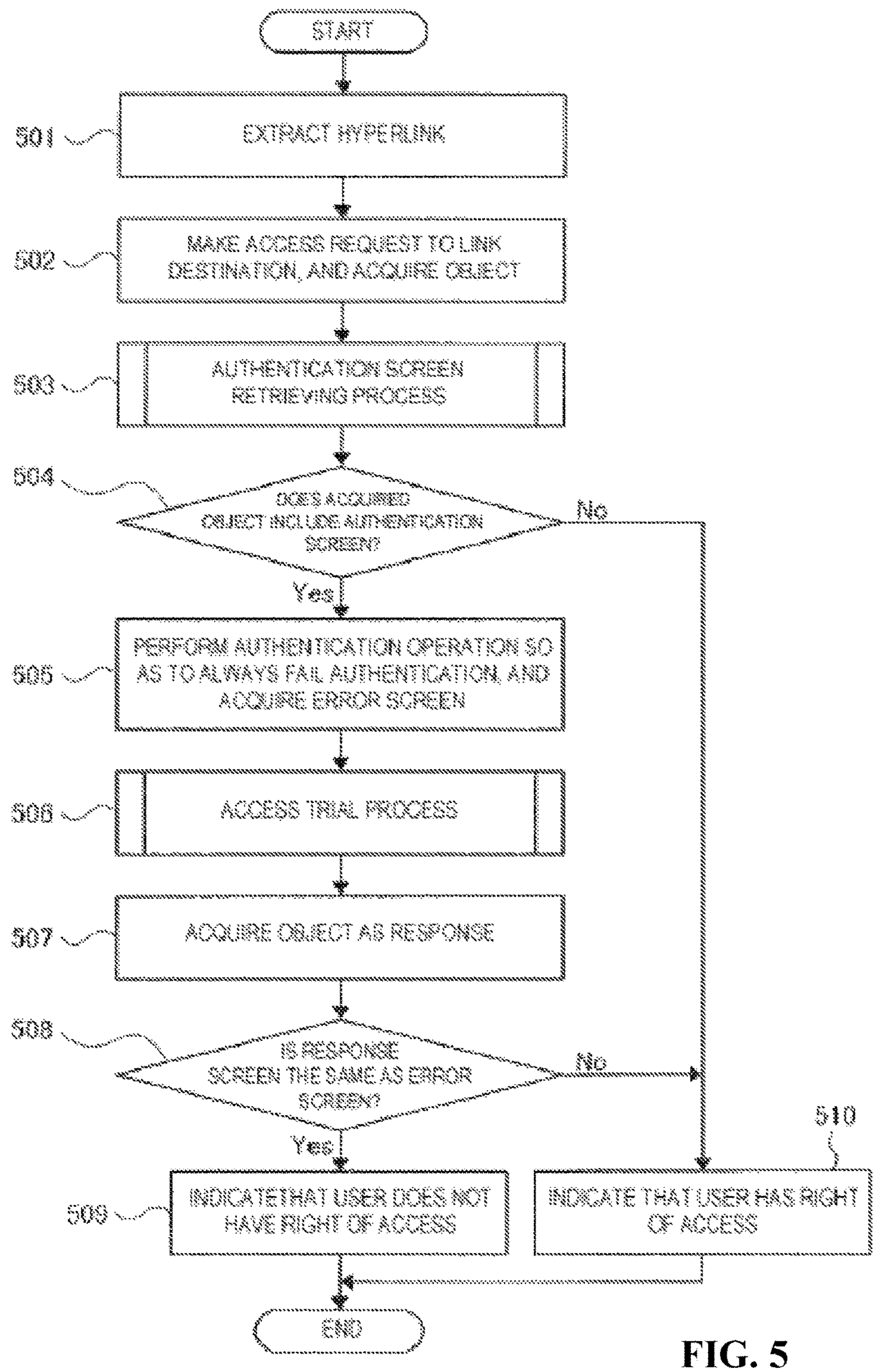
FIG. 5 is a flowchart illustrating a flow of an accessibility determining process performed by the file displaying apparatus, in accordance with an embodiment of the present disclosure.

FIG. 5 is a flowchart illustrating a flow of the accessibility determining process performed by the file displaying apparatus 100, in accordance with an embodiment of the present disclosure. As illustrated in FIG. 5, first, the link extracting unit 130 extracts a hyperlink included in a display target file at a present timing such as the timing of acquisition of the display target file (Step 501). Then, the file acquiring unit 120 makes an access request to a site at a link destination of the hyperlink extracted by the link extracting unit 130, and acquires an object at the link destination (Step 502).

Then, the authentication screen retrieving unit 140 performs an authentication screen retrieving process of examining whether or not the object acquired in Step 502 includes an authentication screen (Step 503). The detail of the authentication screen retrieving process is described hereafter.

As a result of the authentication screen retrieving process performed by the authentication screen retrieving unit 140, if it is determined that the object acquired in Step 502 does not include the authentication screen (No in Step 504), the display controlling unit 180 displays information indicating that the user has the right of access to the object at the link destination of the hyperlink included in the display target file, onto the display image based on the display target file displayed on the display unit 190 (Step 510). This is because the user can access the object at the link destination of the hyperlink extracted in Step 501, without being required to perform an authentication operation.

As a result of the authentication screen retrieving process performed by the authentication screen retrieving unit 140, if it is determined that the object acquired in Step 502 includes the authentication screen (Yes in Step 504), the accessibility determining unit 150 then performs an authentication operation so as to fail the authentication, and acquires an error screen (a screen indicating an authentication failure) returned from the site at the link destination (Step 505). Here, the authentication operation that results in the authentication failure is performed by, for example: leaving input information (such as an ID and a password inputted for the authentication) blank; or inputting an irrelevant character string that does not fall under the ID and the password or a character string including characters that are not permitted to be used as authentication information. The error screen acquired in Step 505 is stored into the error screen storing unit 170.

Then, the accessibility determining unit 150 performs an access trial process of: performing an authentication operation on the authentication screen acquired in Step 502, using the authentication information stored in the authentication information DB 160; and trying to access the object at the link destination of the hyperlink extracted in Step 501 (Step 506). The detail of the access trial process is described hereafter. Through the access trial process, the file acquiring unit 120 acquires an object as a response to the access request, from the site at the link destination (Step 507).

Then, the accessibility determining unit 150 generates a response screen based on the object acquired in Step 507 (a screen when the acquired object is displayed on the display unit 190), and compares the response screen with the error screen acquired in Step 505. Then, if the response screen is the same as the error screen (Yes in Step 508), the accessibility determining unit 150 determines that the object at the link destination of the hyperlink extracted in Step 501 cannot be accessed (the user does not have the right of access thereto). Then, the display controlling unit 180 displays that the user does not have the right of access to the object at the link destination of the hyperlink included in the display target file, onto the display image based on the display target file displayed on the display unit 190 (Step 509).

If the response screen is not the same as the error screen (No in Step 508), the accessibility determining unit 150 determines that the object at the link destination of the hyperlink extracted in Step 501 can be accessed (the user has the right of access thereto). Then, the display controlling unit 180 displays information indicating that the user has the right of access to the object at the link destination of the hyperlink included in the display target file, onto the display image based on the display target file displayed on the display unit 190 (Step 510).

Note that, in the operation illustrated in FIG. 5, the hyperlink is extracted at a predetermined timing (see Step 501), and the object at the link destination of the extracted hyperlink is acquired (see Step 502). Here, before the object at the link destination is acquired, it may be examined whether or not the URL of the link destination of the extracted hyperlink is registered in the authentication information DB 160. Then, if the URL of the link destination is registered in the authentication information DB 160, it may be examined how many days and hours have elapsed from the previous determination of the accessibility of the URL to the present. If the elapsed days and hours exceed a preset threshold, the processing in Step 502 and the subsequent steps may be performed. In this way, a complicated process of extracting a link each time can be avoided for a hyperlink set to frequently displayed files.

Figure 6:
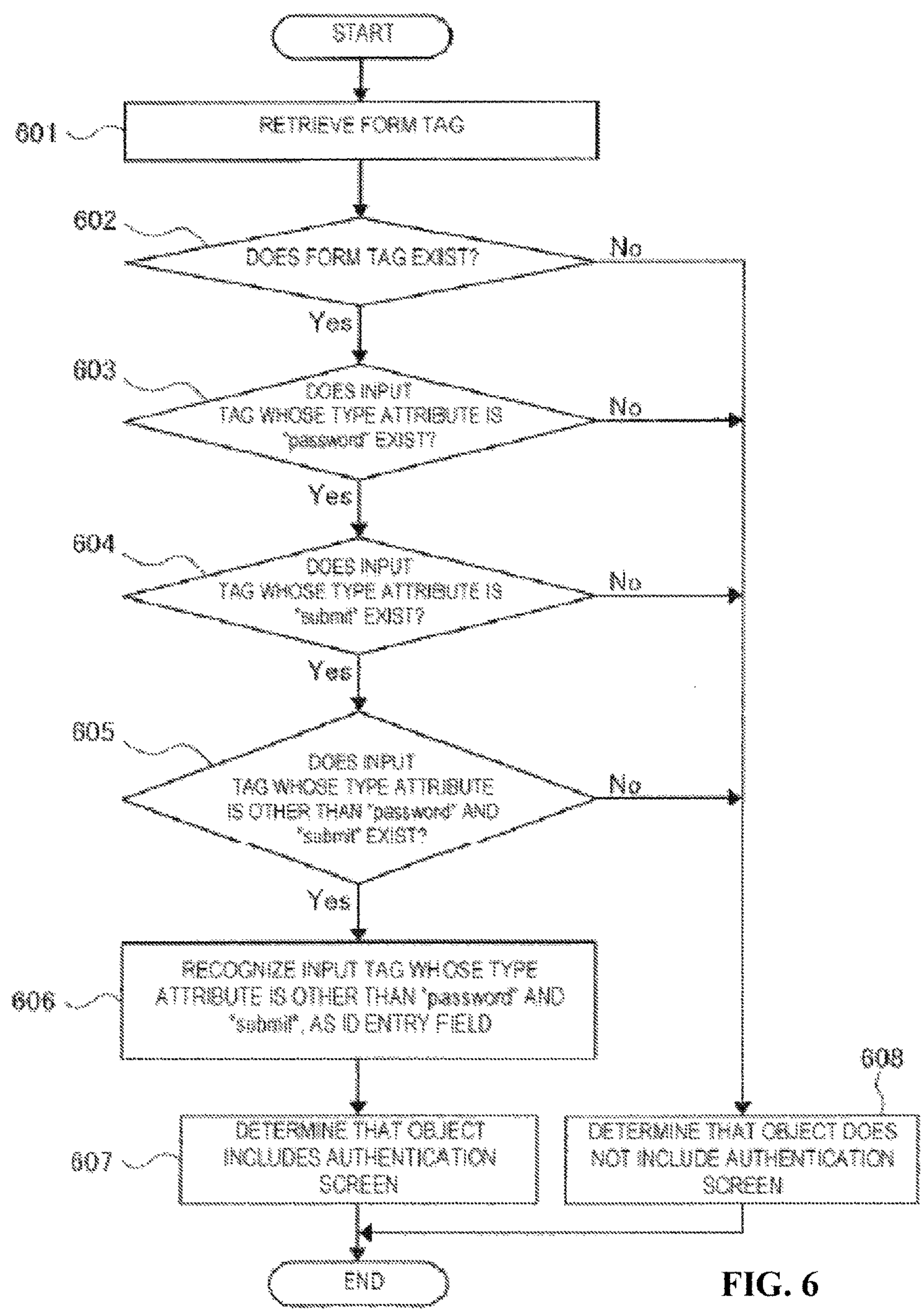
FIG. 6 is a flowchart illustrating a flow of an authentication screen retrieving process performed by an authentication screen retrieving unit, in accordance with an embodiment of the present disclosure.

Authentication Screen Retrieving Process:

FIG. 6 is a flowchart illustrating a flow of the authentication screen retrieving process performed by the authentication screen retrieving unit 140, in accordance with an embodiment of the present disclosure. In the authentication screen retrieving process illustrated in Step 503 of FIG. 5, the authentication screen retrieving unit 140 first retrieves a FORM tag from the source code of the object acquired in Step 502 of FIG. 5 (Step 601). If the FORM tag exists (Yes in Step 602), the authentication screen retrieving unit 140 then examines whether or not an INPUT tag whose type attribute is "password" exists in the source code. If the INPUT tag whose type attribute is "password" exists (Yes in Step 603), the authentication screen retrieving unit 140 then examines whether or not an INPUT tag whose type attribute is "submit" exists.

If the INPUT tag whose type attribute is "submit" exists (Yes in Step 604), the authentication screen retrieving unit 140 then examines whether or not an INPUT tag whose type attribute is other than "password" and "submit" exists. If the INPUT tag exists (Yes in Step 605), the authentication screen retrieving unit 140 recognizes the INPUT tag detected in Step 605, as an ID entry field (Step 606). The authentication screen retrieving unit 140 then determines that the object acquired in Step 502 of FIG. 5 includes the authentication screen (Step 607).

In any of the cases where the FORM tag does not exist in the source code of the object acquired in Step 502 of FIG. 5 (No in Step 602), where the INPUT tag whose type attribute is "password" does not exist (No in Step 603), where the INPUT tag whose type attribute is "submit" does not exist (No in Step 604), and where the INPUT tag whose type attribute is other than "password" and "submit" does not exist (No in Step 605), the authentication screen retrieving unit 140 determines that the object acquired in Step 502 of FIG. 5 does not include the authentication screen (Step 608). Note that any of the determinations in Step 603 to Step 605 in the process illustrated in FIG. 6 may be made earlier, and the order of the determinations is not limited to the order illustrated in FIG. 6.

FIG. 7 is a diagram illustrating an example of the source code of the object, in accordance with an embodiment of the present disclosure. A source code 700 illustrated in FIG. 7 includes: a FORM tag 701; an INPUT tag 702 whose type attribute is "password"; an INPUT tag 703 whose type attribute is "submit"; and an INPUT tag 704 whose type attribute is other than "password" and "submit". Accordingly, it is determined that the object based on the source code illustrated in FIG. 7 includes an authentication screen. Note that the type attribute of the INPUT tag 704 illustrated in FIG. 7 is "email".

Figure 8:
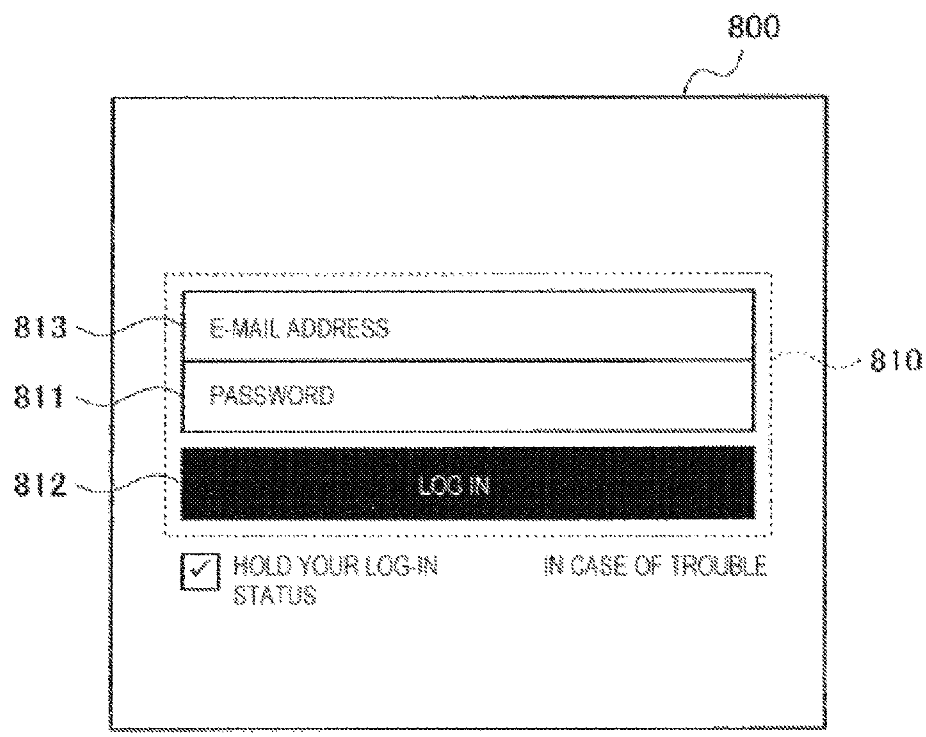
FIG. 8 is a diagram illustrating a display example of the object that is based on the source code illustrated in FIG. 7 and includes an authentication screen, in accordance with an embodiment of the present disclosure.

FIG. 8 is a diagram illustrating a display example of the object that is based on the source code illustrated in FIG. 7 and includes the authentication screen, in accordance with an embodiment of the present disclosure. In an object 800 illustrated in FIG. 8, a region 810 indicated by a broken line is an authentication screen set on the basis of the FORM tag 701 in the source code illustrated in FIG. 7. Then, an input form 811 is an input form for inputting a password, which is set on the basis of the INPUT tag 702. Moreover, a button object 812 is a submit button set on the basis of the INPUT tag 703. Moreover, an input form 813 is an input form for inputting an ID, which is set on the basis of the INPUT tag 704.

Figure 9:
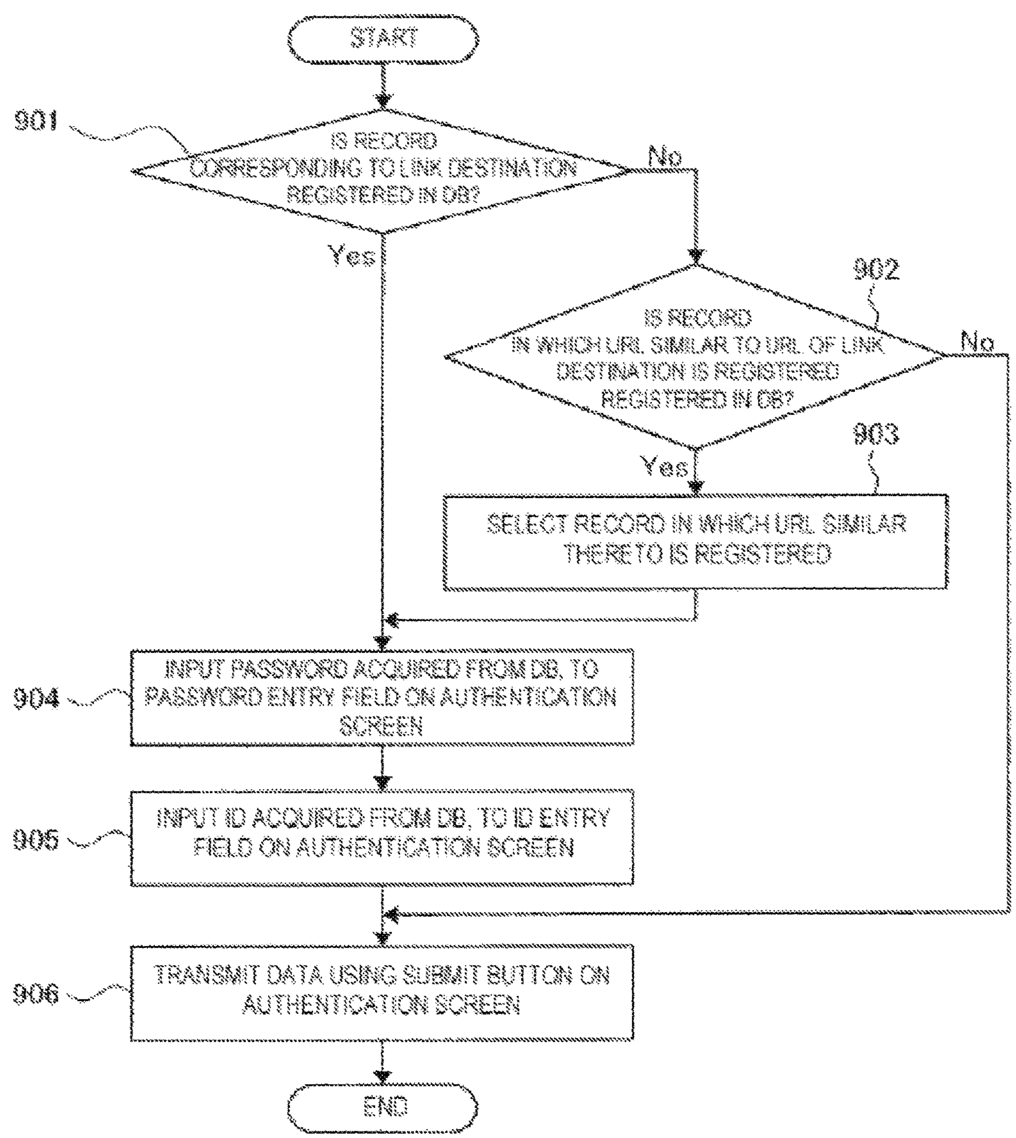
FIG. 9 is a flowchart illustrating a flow of an access trial process performed by an accessibility determining unit, in accordance with an embodiment of the present disclosure.

Access Trial Process:

FIG. 9 is a flowchart illustrating a flow of the access trial process performed by the accessibility determining unit 150, in accordance with an embodiment of the present disclosure. In the access trial process illustrated in Step 506 of FIG. 5, the accessibility determining unit 150 first examines whether or not a record corresponding to the link destination of the hyperlink extracted in Step 501 of FIG. 5 is registered in the authentication information DB 160 (Step 901). Specifically, the accessibility determining unit 150 retrieves a record in which the same URL as the URL of the link destination is registered, from the authentication information DB 160.

If the record corresponding to the link destination of the hyperlink is registered in the authentication information DB 160 (Yes in Step 901), the accessibility determining unit 150 then inputs the password of the record corresponding to the link destination read out of the authentication information DB 160, to the password entry field (for example, the input form 811 in FIG. 8) on the authentication screen retrieved by the authentication screen retrieving unit 140 (Step 904). The accessibility determining unit 150 further inputs the ID of the record corresponding to the link destination read out of the authentication information DB 160, to the ID entry field (for example, the input form 813 in FIG. 8) on the authentication screen retrieved by the authentication screen retrieving unit 140 (Step 905). Then, with the use of a function provided to the submit button (for example, the button object 812 in FIG. 8) on the authentication screen retrieved by the authentication screen retrieving unit 140, the accessibility determining unit 150 transmits data for requesting the object at the link destination, together with the pieces of authentication information inputted in Steps 904 and 905 (Step 906).

If the record corresponding to the link destination of the hyperlink is not registered in the authentication information DB 160 (No in Step 901), the accessibility determining unit 150 then examines whether or not a record in which a URL similar to the URL of the link destination (similar network position information) is registered exists among the records registered in the authentication information DB 160 (Step 902). If the record in which a URL similar to the URL of the link destination is registered exists, the accessibility determining unit 150 selects the record (Step 903). Then, the accessibility determining unit 150 inputs the password and the ID of the selected record to the authentication screen, and transmits data for requesting the object at the link destination (Steps 904 to 906).

If it is determined in Step 902 that the record in which a URL similar to the URL of the link destination is registered does not exist, authentication information for performing an authentication operation is not specified. Consequently, the accessibility determining unit 150 transmits data for requesting the object at the link destination, without inputting a password and an ID to the authentication screen (Step 906). In this case, the same screen as the error screen acquired in Step 505 of FIG. 5 is acquired. Hence, the accessibility determining unit 150 determines, in Step 508 of FIG. 5, that the response screen is the same as the error screen, and the display controlling unit 180 displays the information indicating that the user does not have the right of access, onto the display unit 190.

Whether or not URLs are similar to each other can be determined by, for example, determining the degrees of similarity of character strings on the basis of: whether or not domains or hosts respectively constituting the URLs are the same as each other; or at what proportion the character string constituting each URL includes the same characters. Moreover, any of the input processes in Step 904 and Step 905 in the process illustrated in FIG. 9 may be performed earlier, and the order of the input processes is not limited to the order illustrated in FIG. 9.

If any of the same URL as the URL of the link destination and a URL similar thereto is not registered in the authentication information DB 160, this means that the object at the link destination has not been accessed until then. Accordingly, at the time of actual access to the object at the link destination, the user may be able to access the object by manually inputting a password and an ID. In view of this, if it is determined in Step 902 that the record in which a URL similar to the URL of the link destination is registered does not exist, the display controlling unit 180 may not display the accessibility of the hyperlink included in the display target file displayed on the display unit 190, instead of displaying the information indicating that the user does not have the right of access as described above. Alternatively, in such a case, the display controlling unit 180 may display information indicating that the accessibility is unknown for the hyperlink included in the display target file displayed on the display unit 190. In the case of displaying the information indicating that the accessibility is unknown, a message to the effect that the accessibility is unknown may be displayed as the display example illustrated in FIG. 3, and the hyperlink portion may be displayed in a display mode set for indicating that the accessibility is unknown, as the display example illustrated in FIG. 4.

Moreover, in some embodiments, in the case where an authentication operation is performed using the password and the ID associated with the URL of the similar network position information acquired in Step 903 of FIG. 9, the authentication operation in this case is not based on the authentication information directly set to the object at the link destination of the hyperlink. Accordingly, even if it is determined in Step 508 of FIG. 5 that the object that is acquired in Step 507 of FIG. 5 in response to this authentication operation is the same as the error screen, at the time of actual access to the object at the link destination, the user may be able to access the object by manually inputting the password and the ID directly set to the object at the link destination. In view of this, in the case where an authentication operation is performed using the password and the ID acquired in Step 903 and where it is determined in Step 508 of FIG. 5 that the response screen is the same as the error screen, the display controlling unit 180 may indicate that the accessibility is unknown for the hyperlink included in the display target file displayed on the display unit 190, similarly to the above.

Creating the Authentication Information Database:

In some embodiments, authentication information is registered in the authentication information DB 160 by performing a registration operation by the user of the file displaying apparatus 100 as well as by automatically registering, when the user performs an authentication operation on the authentication screen, information inputted in the authentication operation.

Figure 10:
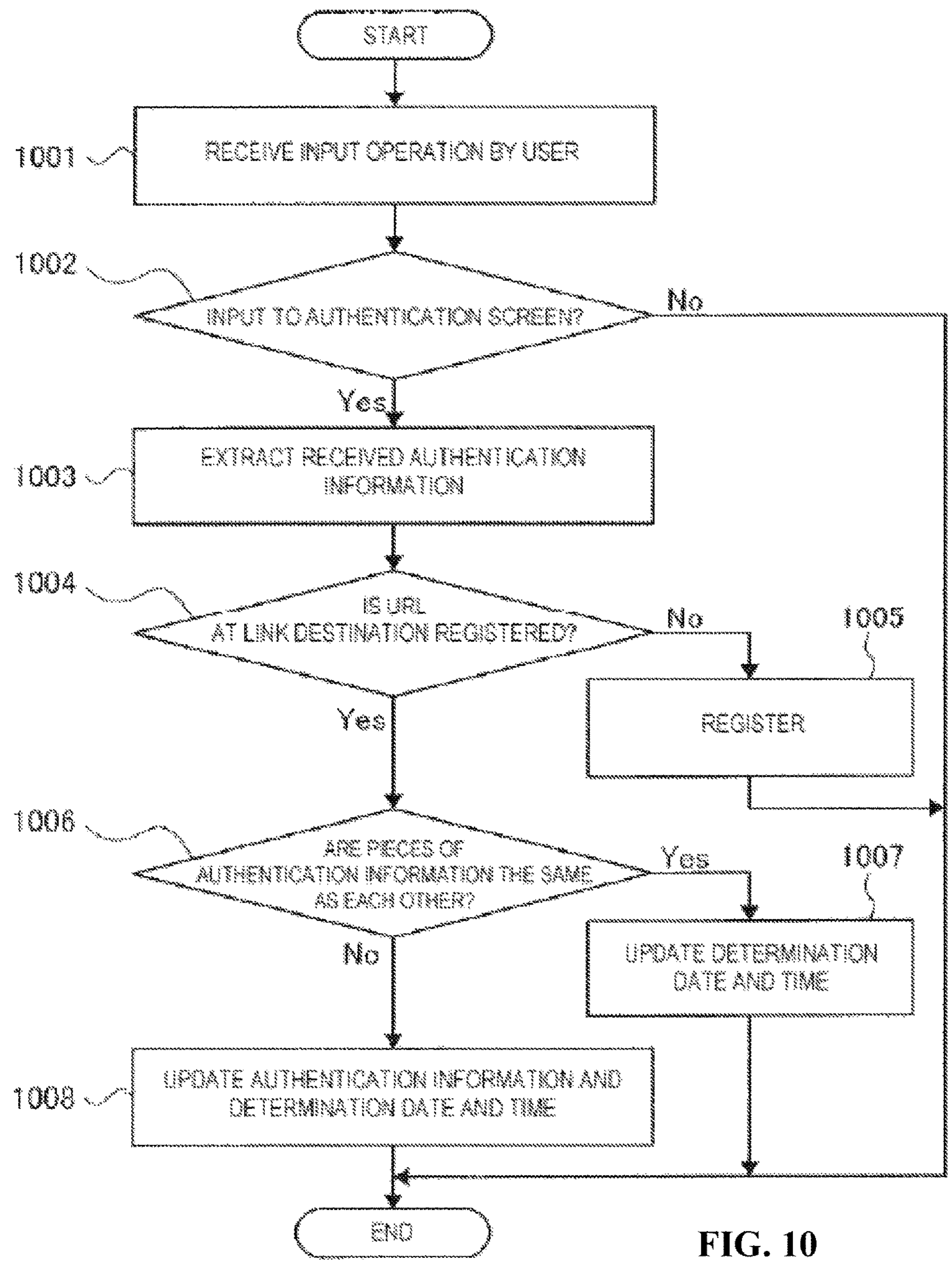
FIG. 10 is a flowchart illustrating a flow of a process performed in the case where authentication information is automatically registered in the authentication information database in response to an authentication operation by a user, in accordance with an embodiment of the present disclosure.

FIG. 10 is a flowchart illustrating a flow of a process performed in the case where the authentication information is automatically registered in the authentication information DB 160 in response to the authentication operation by the user, in accordance with an embodiment of the present disclosure. Upon reception of an input operation by the user (Step 1001), the file displaying apparatus 100 determines whether or not the received input is an input to the authentication screen (Step 1002). Specifically, for example, as described with reference to FIG. 6, the file displaying apparatus 100 examines whether or not the source code of the object displayed on the display unit 190 includes a predetermined FORM tag and a predetermined INPUT tag, and thus can determine whether or not the input target object includes the authentication screen. Then, if the input target object includes the authentication screen, the file displaying apparatus 100 examines whether or not the field to which the user inputs information through the input operation is any of input forms (for example, the input forms 811 and 813 illustrated in FIG. 8) based on INPUT tags for inputting a password and an ID, and thus can determine whether or not the received input operation is an input operation of the authentication information.

If the received input is an input to the authentication screen, the file displaying apparatus 100 then extracts the received authentication information (Step 1003). Here, the file displaying apparatus 100 extracts the password and the ID in accordance with the input forms to which the user inputs information. The file displaying apparatus 100 then examines whether or not the URL of the access request destination when the authentication screen is acquired is registered in the authentication information DB 160 (Step 1004). Then, if the URL of the access request destination is not registered in the authentication information DB 160, the file displaying apparatus 100 registers the authentication information (the password and the ID) extracted in Step 1003 and the URL of the access request destination into the authentication information DB 160 (Step 1005). The file displaying apparatus 100 also registers registration date and time (determination date and time) into the record in which the authentication information and the URL are newly registered.

If the URL of the access request destination is registered in the authentication information DB 160, the file displaying apparatus 100 then examines whether or not the authentication information extracted in Step 1003 is the same as the authentication information registered in the corresponding record in the authentication information DB 160 (Step 1006). Then, if the two pieces of authentication information are the same as each other, the file displaying apparatus 100 updates only the determination date and time in the corresponding record (Step 1007). On the other hand, if the two pieces of authentication information are not the same as each other, the file displaying apparatus 100 updates the authentication information and the determination date and time in the corresponding record (Step 1008).

Figure 11:
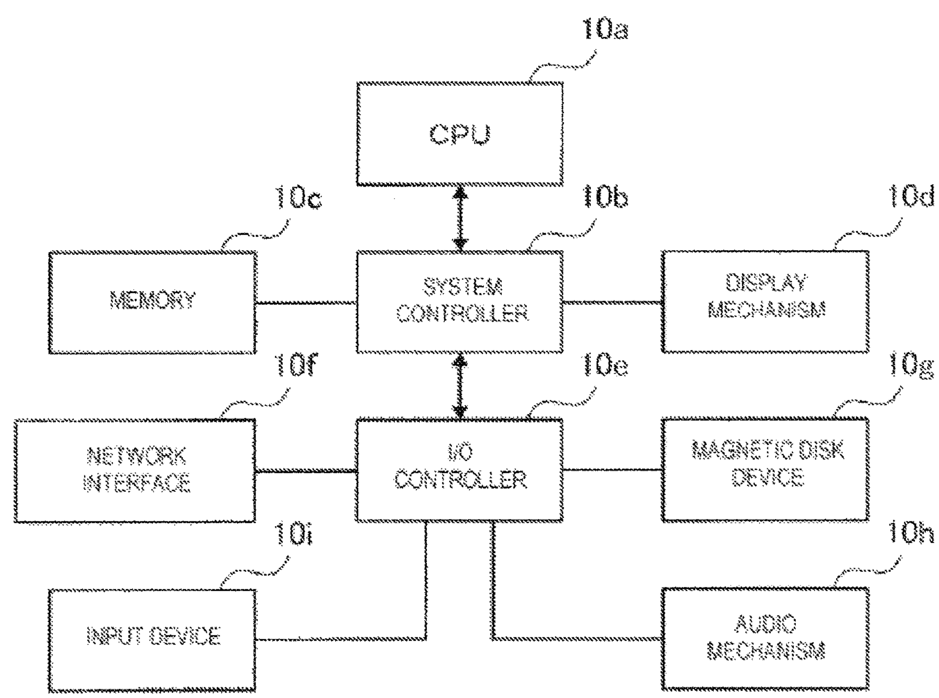
FIG. 11 is a diagram illustrating a preferable hardware configuration example for configuring the file displaying apparatus, in accordance with an embodiment of the present disclosure.

Hardware Configuration Example:

FIG. 11 is a diagram illustrating a hardware configuration example for configuring the file displaying apparatus 100, in accordance with an embodiment of the present disclosure. Description is given here of the case where the hardware configuration example is applied to a computer. The computer illustrated in FIG. 11 includes a central processing unit (CPU) 10*a* as arithmetic means and a memory 10*c* as main storage means. The computer illustrated in FIG. 11 further includes, as external devices, a magnetic disk device (hard disk drive (HDD)) 10*g*, a network interface 10*f*, a display mechanism 10*d* including a display device, an audio mechanism 10*h*, and an input device 10*i* such as a keyboard and a mouse.

In the configuration example illustrated in FIG. 11, the memory 10*c* and the display mechanism 10*d* are connected to the CPU 10*a* through a system controller 10*b*. Moreover, the network interface 10*f*, the magnetic disk device 10*g*, the audio mechanism 10*h*, and the input device 10*i* are connected to the system controller 10*b* through an I/O controller 10*e*. These components are connected by various buses such as a system bus and an input/output bus.

Note that FIG. 11 illustrates, as a mere example, the hardware configuration of the computer to which an embodiment is applied. The present disclosure can be widely applied to information processing apparatuses each having a function of: acquiring and displaying a hyperlinked file, such as a web page and an e-mail message; and accessing an object at a link destination of the hyperlink. Hence, the implementation of the present disclosure is not limited to only the configuration illustrated in FIG. 11.

In FIG. 11, an OS program and an application program are stored in the magnetic disk device 10*g*. Then, these programs are loaded onto the memory 10*c*, and are executed by the CPU 10*a*, whereby the respective functions of the file acquiring unit 120, the link extracting unit 130, the authentication screen retrieving unit 140, the accessibility determining unit 150, and the display controlling unit 180 included in the file displaying apparatus 100 according to the present disclosure are achieved. Moreover, the authentication information DB 160 and the error screen storing unit 170 are achieved by storage means such as the memory 10*c* and the magnetic disk device 10*g*. Moreover, the display unit 190 is achieved by the display mechanism 10*d*, and the transmitting and receiving unit 110 is achieved by the network interface 10*f*. Moreover, the user operates the input device 10*i* to input: a command for acquiring a display target file; a request for access to an object at a link destination of a hyperlink; authentication information to the authentication screen; and the like.

While the present disclosure has been described above with respect to the embodiment, the present disclosure is not limited to the above-mentioned specific configurations, and any embodiment obtained by variously changing or improving the above-mentioned embodiment is also included in a technique scope of the present disclosure.

Various aspects of the present disclosure are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

LIST OF REFERENCES

100 file displaying apparatus
110 transmitting and receiving unit

120 file acquiring unit
130 link extracting unit
140 authentication screen retrieving unit
150 accessibility determining unit
160 authentication information database (DB)
170 error screen storing unit
180 display controlling unit
190 display unit

What is claimed is:

1. A method for displaying an accessibility of a hyperlinked file, the method comprising:

extracting, by one or more computer processors, a hyperlink from a target file, wherein the hyperlink references a resource that requires authentication for access to the resource, wherein extracting a hyperlink from a target file further comprises:

retrieving a FORM tag from a source code of the resource;

determining the source code of the resource comprises a first INPUT tag having a first attribute comprising a password attribute;

determining the source code of the resource comprises a second INPUT tag having a second attribute comprising a submit attribute;

determining the source code of the resource comprises a third INPUT tag having a third attribute that is not a password attribute and not a submit attribute; and determining the hyperlink includes an authentication screen;

performing, by one or more computer processors and in response to extracting the hyperlink from the target file, a first authentication operation configured to fail authentication for access to the resource and, in response, receiving, from a server associated with the resource, a first object indicating the first authentication operation failed, wherein the first object comprises an error screen;

acquiring, by one or more computer processors and in response to performing the first authentication operation, a second object from the server associated with the resource by performing a second authentication operation using pre-determined authentication information;

comparing, by one or more computer processors, the first object and the second object to determine if the first object is the same as the second object; and presenting, by one or more computer processors, via a display apparatus, information indicating the accessibility of the resource, wherein the information is based, at least in part, on the comparison between the first object and the second object and further based, at least in part, on the target file.

2. The method according to claim 1, wherein the hyperlink is extracted from the target file in response to determining that a predetermined duration of time has lapsed since a previous determination of the accessibility of the resource.

3. The method according to claim 1, wherein the predetermined authentication information is associated with network position information of the resource, and wherein the second authentication operation is based, at least in part, on the network position information.

4. The method according to claim 3, further comprising:

determining, by one or more computer processors, that the network position information of the resource is not registered, and in response, retrieving, by one or more computer processors, similar network position information that is determined to be similar to the network position information of the resource, wherein the similar network position information is not identical to the network position information of the resource;

performing, by one or more computer processors, the first authentication operation using other authentication information associated with the similar network position information; and determining, by one or more computer processors, that the first object is the same as the second object received in response to the first authentication operation performed with the other authentication information and, in response, presenting information on the display apparatus indicating that the accessibility of the resource is unknown.

5. The method according to claim 1, wherein the first authentication operation includes inputting no authentication information into an authentication screen, wherein the first authentication operation fails in response to submitting the authentication screen with no authentication information.

6. The method according to claim 1, wherein the first authentication operation includes inputting into an authentication screen a character string that includes characters that are not permitted to be used as the authentication information, wherein the first authentication operation fails in response to submitting the authentication screen containing characters that are not permitted.

7. The method according to claim 1, wherein comparing the first object and the second object includes comparing an image resulting from displaying the first object on the display apparatus to an image resulting from displaying the second object on the display apparatus.

8. A computer program product for displaying an accessibility of hyperlinked file, the computer program product comprising:

a computer readable storage medium, wherein the computer readable storage medium is not a transitory signal per se, and program instructions stored on the computer readable storage medium, the program instructions comprising:

program instructions to extract a hyperlink from a target file, wherein the hyperlink references a resource that requires authentication for access to the resource, wherein extracting a hyperlink from a target file further comprises:

retrieving a FORM tag from a source code of the resource;

determining the source code of the resource comprises a first INPUT tag having a first attribute comprising a password attribute;

determining the source code of the resource comprises a second INPUT tag having a second attribute comprising a submit attribute;

determining the source code of the resource comprises a third INPUT tag having a third attribute that is not a password attribute and not a submit attribute; and determining the hyperlink includes an authentication screen;

program instructions to perform, in response to extracting the hyperlink from the target file, a first authentication operation configured to fail authentication for access to the resource and, in response, receive, from a server associated with the resource, a first object indicating the first authentication operation failed, wherein the first object comprises an error screen;

program instructions to acquire, in response to performing the first authentication operation, a second object from the server associated with the resource by performing a second authentication operation using pre-determined authentication information;

program instructions to compare the first object and the second object to determine if the first object is the same as the second object; and program instructions to present, via a display apparatus, information indicating the accessibility of the resource, wherein the information is based, at least in part, on the comparison between the first object and the second object and further based, at least in part, on the target file.

9. The computer program product according to claim 8, wherein the hyperlink is extracted from the target file in response to determining that a predetermined duration of time has lapsed since a previous determination of the accessibility of the resource.

10. The computer program product according to claim 8, wherein the pre-determined authentication information is associated with network position information of the resource, and wherein the second authentication operation is based, at least in part, on the network position information.

11. The computer program product according to claim 10, the program instructions further comprising:

program instructions to determine that the network position information of the resource is not registered, and in response, retrieve similar network position information that is determined to be similar to the network position information of the resource, wherein the similar network position information is not identical to the network position information of the resource;

program instructions to perform the first authentication operation using other authentication information associated with the similar network position information; and program instructions to determine that the first object is the same as the second object received in response to the first authentication operation performed with the other authentication information and, in response, present information on the display apparatus indicating that the accessibility of the resource is unknown.

12. The computer program product according to claim 8, wherein the first authentication operation includes inputting no authentication information into an authentication screen, wherein the first authentication operation fails in response to submitting the authentication screen with no authentication information.

13. The computer program according to claim 8, wherein the first authentication operation includes inputting into an authentication screen a character string that includes characters that are not permitted to be used as the authentication information, wherein the first authentication operation fails in response to submitting the authentication screen containing characters that are not permitted.

14. The computer program product according to claim 8, wherein comparing the first object and the second object includes comparing an image resulting from displaying the first object on the display apparatus to an image resulting from displaying of the second object on the display apparatus.

15. A computer system for displaying an accessibility of a hyperlinked file, the computer system comprising:

one or more computer processors, wherein the one or more computer processors comprise hardware processors;

one or more computer readable storage media, wherein the one or more computer readable storage media are not transitory signals per se;

program instructions stored on the computer readable storage media for execution by at least one of the one or more processors, the program instructions comprising:

program instructions to extract a hyperlink from a target file, wherein the hyperlink references a resource that requires authentication for access to the resource, wherein extracting a hyperlink from a target file further comprises:

retrieving a FORM tag from a source code of the resource;

determining the source code of the resource comprises a first INPUT tag having a first attribute comprising a password attribute;

determining the source code of the resource comprises a second INPUT tag having a second attribute comprising a submit attribute;

determining the source code of the resource comprises a third INPUT tag having a third attribute that is not a password attribute and not a submit attribute; and determining the hyperlink includes an authentication screen;

program instructions to perform, in response to extracting the hyperlink from the target file, a first authentication operation configured to fail authentication for access to the resource and, in response, receive, from a server associated with the resource, a first object indicating the first authentication operation failed, wherein the first object comprises an error screen;

program instructions to acquire, in response to performing the first authentication operation, a second object from the server associated with the resource by performing a second authentication operation using pre-determined authentication information;

program instructions to compare the first object and the second object to determine if the first object is the same as the second object; and program instructions to present, via a display apparatus, information indicating the accessibility of the resource, wherein the information is based, at least in part, on the comparison between the first object and the second object and further based, at least in part, on the target file.

16. The computer system according to claim 15, wherein the hyperlink is extracted from the target file in response to determining that a predetermined duration of time has lapsed since a previous determination of the accessibility of the resource.

17. The computer system according to claim 15, wherein the pre-determined authentication information is associated with network position information of the resource, and wherein the second authentication operation is based, at least in part, on the network position information.

18. The computer system according to claim 17, the program instructions further comprising:

program instructions to determine that the network position information of the resource is not registered, and in response, retrieve similar network position information that is determined to be similar to the network position information of the resource, wherein the similar network position information is not identical to the network position information of the resource;

program instructions to perform the first authentication operation using other authentication information associated with the similar network position information; and program instructions to determine that the first object is the same as the second object received in response to the first authentication operation performed with the other authentication information and, in response, present information on the display apparatus indicating that the accessibility of the resource is unknown.

* * * * *